United States Patent
Guo et al.

(10) Patent No.: US 11,505,715 B2
(45) Date of Patent: Nov. 22, 2022

(54) AQUEOUS MATTE COATING COMPOSITIONS

(71) Applicant: Dow Global Technologies LLC, Midland, MI (US)

(72) Inventors: Yinzhong Guo, Pearland, TX (US); Wenwen Li, Pearland, TX (US); Kalyan Sehanobish, Sanford, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 312 days.

(21) Appl. No.: 16/341,844

(22) PCT Filed: Aug. 7, 2017

(86) PCT No.: PCT/US2017/045668
§ 371 (c)(1),
(2) Date: Apr. 12, 2019

(87) PCT Pub. No.: WO2018/071088
PCT Pub. Date: Apr. 19, 2018

(65) Prior Publication Data
US 2019/0315994 A1    Oct. 17, 2019

Related U.S. Application Data

(60) Provisional application No. 62/408,096, filed on Oct. 14, 2016.

(51) Int. Cl.
| | |
|---|---|
| C09D 133/04 | (2006.01) |
| C09D 7/42 | (2018.01) |
| C09D 7/40 | (2018.01) |
| C08G 18/83 | (2006.01) |
| C08L 75/04 | (2006.01) |
| C08L 83/04 | (2006.01) |
| C08L 91/06 | (2006.01) |
| C09D 5/03 | (2006.01) |

(52) U.S. Cl.
CPC ........... *C09D 133/04* (2013.01); *C08G 18/83* (2013.01); *C08L 75/04* (2013.01); *C08L 83/04* (2013.01); *C08L 91/06* (2013.01); *C09D 5/032* (2013.01); *C09D 7/42* (2018.01); *C09D 7/68* (2018.01); *C09D 7/69* (2018.01); *C08L 2201/54* (2013.01); *C08L 2205/025* (2013.01); *C08L 2205/035* (2013.01); *C08L 2312/00* (2013.01)

(58) Field of Classification Search
CPC ... C09D 7/68; C09D 7/69; C09D 7/42; C09D 133/04
See application file for complete search history.

(56) References Cited

U.S. PATENT DOCUMENTS

| | | | |
|---|---|---|---|
| 7,078,102 B2 * | 7/2006 | Robertson | C08J 7/043 428/424.2 |
| 7,829,626 B2 | 11/2010 | Chiou et al. | |
| 8,436,096 B2 | 5/2013 | LaFleur et al. | |
| 8,563,130 B2 | 10/2013 | Chung et al. | |
| 8,795,829 B2 | 8/2014 | Chung et al. | |
| 8,900,669 B2 | 12/2014 | LaFleur et al. | |
| 9,410,053 B2 | 8/2016 | Kamel et al. | |
| 2006/0121289 A1 | 6/2006 | Robertson | |
| 2007/0218291 A1 | 9/2007 | Chiou et al. | |
| 2011/0249324 A1 | 10/2011 | Greer et al. | |
| 2013/0052357 A1 | 2/2013 | Lafleur et al. | |
| 2015/0197659 A1 | 7/2015 | Kamel et al. | |
| 2016/0017133 A1 | 1/2016 | Chen et al. | |
| 2016/0024263 A1 | 1/2016 | Griffith et al. | |

FOREIGN PATENT DOCUMENTS

| | | |
|---|---|---|
| CN | 104861808 | 8/2015 |
| EP | 2657308 | 10/2013 |
| WO | 2010048862 | 5/2010 |
| WO | 2015048124 | 4/2015 |
| WO | 2015117111 | 8/2015 |
| WO | 2015123126 | 8/2015 |
| WO | 2015160904 | 10/2015 |
| WO | 2015195750 | 12/2015 |
| WO | 2016023645 | 2/2016 |

OTHER PUBLICATIONS

PCT/US2017/045668, International Search Report and Written Opinion with a dated Oct. 26, 2017.
PCT/US2017/045668, International Preliminary Report on Patentability with a dated Apr. 16, 2019.

* cited by examiner

*Primary Examiner* — Vickey Nerangis

(57) ABSTRACT

Aqueous matte coating compositions and methods for applying aqueous matte coating compositions to substrates are disclosed. The compositions comprise (a) from 10 to 65 wt % of a first acrylic bead having a calculated glass transition temperature ("Tg") of from −30 to 10° C. and an average diameter particle of from 0.1 to 2 μm, (b) from 20 to 80 wt % of a second acrylic bead having a calculated Tg of from −60 to 0° C. and an average particle diameter of from 0.5 to 30 μm, optionally (c) from 10 to 30 wt % of a polymer binder having an average particle diameter of 0.03 to 0.5 μm, and (d) a slip additive. In some embodiments, the slip additive comprises a silicone emulsion and a wax dispersion. In some embodiments, the slip additive comprises a polyurethane dispersion. Methods for applying aqueous matte coating compositions are also disclosed.

4 Claims, No Drawings

AQUEOUS MATTE COATING COMPOSITIONS

REFERENCE TO RELATED APPLICATIONS

The present application claims the benefit of U.S. Provisional Application No. 62/408,096, filed on Oct. 14, 2016.

FIELD OF THE DISCLOSURE

The instant disclosure relates to aqueous matte coating compositions and methods for applying aqueous matte coating compositions to substrates. In particular, this disclosure relates to aqueous matte coating compositions comprising acrylic beads and slip additives. The disclosed aqueous matte coatings can be used in, for example, packaging applications. The disclosed compositions and methods provide for matte finishes with better color fidelity, enhanced abrasion resistance, soft touch response, and lower coefficient of friction.

BACKGROUND AND SUMMARY OF THE DISCLOSURE

Matte finishes are commonly used in packaging applications (e.g., food packaging applications) to alter the functionality and/or appearance of the packaging. For example, matte finishes can enhance a packaging's optical appearance, touch or tactile response, ink and image protection for direct printing, processability, etc. Currently, most matte finishes are formulated from inorganic fillers, such as silica, with acrylic and/or polyurethane binders, either solventborne or waterborne. However, existing matte finishes exhibit low color fidelity and weak abrasion resistance in, e.g., both gravure and flexographic printing application areas.

Recently, matte finishes incorporating polyurethane beads have addressed soft touch, color fidelity and abrasion resistance issues encountered by previous matte finishes. However, polyurethane beads are relatively expensive and have heat seal resistance concerns. Even more recently, matte finishes including acrylic beads and aminosilanes have been used to address the issues noted above. However, even the incorporation of these acrylic beads and aminosilanes have not fully addressed the unmet needs of customers. Accordingly, aqueous matte coating compositions providing for better color fidelity, enhanced abrasion resistance, soft touch response, and lower coefficient of friction are desirable.

The instant disclosure relates to aqueous matte coating compositions and methods for applying aqueous matte coating compositions to substrates. In particular, this disclosure relates to aqueous matte coating compositions comprising acrylic beads and slip additives. In some embodiments, the compositions comprise a first acrylic bead, a second acrylic bead, a polymer binder, and/or a slip additive. In some embodiments, the first acrylic bead accounts for from 10 to 65 wt %, based on the weight of the coating composition, and has a calculated glass transition temperature ("$T_g$") of from −30 to 10° C. and average particle diameter of from 0.1 to 2 μm. All weight percentages described herein refer to weight calculated on a dry-weight basis. In some embodiments, the second acrylic bead accounts for from 20 to 80 wt %, based on the weight of the coating composition, and has a calculated $T_g$ of from −60 to 0° C. and an average particle diameter of from 3 to 30 μm. In some embodiments, the polymer binder accounts for from 10 to 30 wt %, based on the weight of the coating composition and has an average particle diameter from 0.03 to 0.5 μm and a calculated $T_g$ of 0 to 30° C. In some embodiments, the slip additive accounts for 0.1 to 20 wt %, based on the weight of the coating composition, and comprises a silicone emulsion and a wax dispersion. In some embodiments, the slip additive comprises a polyurethane dispersion. In some embodiments, the slip additive comprises two or more selected from the group consisting of a silicone emulsion, a wax dispersion, and a polyurethane dispersion. In some embodiments, the slip additive comprises the combination of more than one type of silicone emulsions and more than one wax dispersion, and more than one polyurethane dispersion.

In some embodiments, the methods for applying aqueous matte coating compositions comprise (a) forming the aqueous matte coating composition comprising (i) from 10 to 65 wt %, based on the weight of the coating composition, of a first acrylic bead having a calculated $T_g$ of from −30 to 10° C. and an average particle diameter of from 0.1 to 2 μm, (ii) from 20 to 80 wt %, based on the weight of the coating composition, of a second acrylic bead having a calculated $T_g$ of from −60 to 0° C. and an average particle diameter of from 0.5 to 30 μm, (iii) from 10 to 30 wt %, based on the weight of the coating composition, of a polymer binder having an average particle diameter of from 0.03 to 0.5 μm and a calculated $T_g$ of 0 to 30° C., and (iv) from 0.1 to 20 wt %, based on the weight the coating composition, of a slip additive. The method further comprises (b) applying the aqueous matte coating composition to a substrate and (c) drying, or allowing to dry, the applied aqueous matte coating composition. In some embodiments, the slip additive comprises a silicone emulsion and a wax dispersion. In some embodiments, the slip additive comprises a polyurethane dispersion. In some embodiments, the slip additive comprises two or more selected from the group consisting of a silicone emulsion, a wax dispersion, and a polyurethane dispersion. In some embodiments, the slip additive comprises the combination of more than one type of silicone emulsions and more than one different wax dispersions, and/or more than one polyurethane dispersions. In some embodiments, the matte coating compositions comprise other additives such as rheology modifiers, defoamers, wetting agents, leveling agents, and the like.

In some embodiments, the matte coating compositions are applied with a polyisocyanate crosslinker at a liquid coating-to-crosslinker ratio of from 100:0.1 to 100:5, based on coating weight.

The disclosed aqueous matte coating compositions can be used with, for example, gravure and flexographic printing application processes.

DETAILED DESCRIPTION OF THE DISCLOSURE

Aqueous matte coating compositions and methods for applying aqueous matte coating compositions to substrates are disclosed. In some embodiments, the aqueous matte coating compositions comprise acrylic beads, polymer binders, and slip additives. In some embodiments, the aqueous matte coating compositions comprise a plurality of acrylic beads, a plurality of acrylic binders, and/or a plurality of slip additives.

First Acrylic Beadsss (Smaller Acrylic Beads)

In some embodiments, the first acrylic beads account for from 10 to 65 wt %, based on the weight of the aqueous matte coating composition, and has a calculated $T_g$ of from −30 to 10° C., or from −30 to 5° C., and an average particle diameter of from 0.1 to 2 μm.

In some embodiments, the first acrylic beads include multi-stage polymeric particles with, for example, a core-shell or other multi-stage morphology, such as a multilobal structure. Multi-stage polymeric particles include a polymeric core phase and one or more polymeric shell phases. The core may be prepared from a variety of vinyl monomers, and may be a rubbery or glassy polymer. The core may be prepared from polymerization or copolymerization of such monomers as diolefins, e.g., butadiene or isoprene; vinyl aromatic monomers, e.g., styrene or chlorostyrene; vinyl esters, e.g., vinyl acetate or vinyl benzoate; acrylonitrile; methacrylonitrile; (meth)acrylate esters, e.g., methyl methacrylate, butyl methacrylate, phenyl methacrylate, ethyl acrylate, butyl acrylate, 2-ethylhexyl acrylate, and benzyl acrylate; vinyl chloride; and other monomers polymerizable by free-radical initiation. In some embodiments, the multi-stage polymeric particles can be described by their predominant components, such as acrylic multi-stage copolymer particles, vinyl multi-stage copolymer particles, multi-stage olefin polymer particles, multi-stage polysiloxane particles, multi-stage synthetic rubber copolymer particles, multi-stage urethane copolymer particles, water-dispersible graft copolymer particles, mixtures thereof, combinations thereof, and mixtures thereof with a single stage crosslinked (co) polymer. In some embodiments, the multi-stage polymeric particles are acrylic multi-stage copolymer particles having good heat, moisture, and UV stability at an attractive cost.

In some embodiments, the core phase of the multi-stage polymeric particles may include synthetic or natural rubbers. In some embodiments, the core phase of the multi-stage polymeric particles may include acrylic rubbers. Acrylic rubber cores include alkyl acrylate copolymers, the alkyl group having from 2 to 8 carbon atoms, copolymerized with from 0 to 15 wt %, or from 0 to 10 wt %, of one or more crosslinkers, based on the total weight of core monomers, from 0 to 15 wt %, or from 0 to 10%, of one or more graftlinker, based on the total weight of core monomers, and from 0 to 50 wt % of one or more copolymerizable ethylenically unsaturated monomer, based on the total weight of core monomers. Of the one or more polymer shells surrounding the acrylic rubber core, the outermost shell polymer is thermodynamically compatible with the second acrylic beads described below. The shell(s) may comprise from 0 to 40 wt % of the multi-stage polymeric particles.

In some embodiments, the alkyl acrylate is t-butyl acrylate or n-butyl acrylate. The copolymerizable ethylenically unsaturated monomer or monomers may be mono ethylenically unsaturated monomers, such as alkyl methacrylates and mono ethylenically unsaturated arenes, e.g., styrene. Ethylenically unsaturated arenes, as used herein, include such monoethylenically unsaturated aromatic monomers as styrene, alkylstyrenes such as methylstyrene and ethylstyrene, other substituted vinylbenzenes wherein the substituents do not interfere with polymerization, and similar vinyl polycyclic aromatic monomers.

Crosslinking monomers suitable for use in the core polymer are generally di- or poly-ethylenically unsaturated monomers copolymerizable with the other core monomers, wherein the ethylenically unsaturated groups have approximately equal reactivity, such as, for example, divinylbenzene ("DVB"); glycol di- and tri-(meth)acrylates, such as, for example, 1,4-butylene glycol dimethacrylate, 1,2-ethylene glycol dimethacrylate, and 1,6-hexanediol diacrylate; triol tri(meth)crylates, diallyl phthalate, and the like. In some embodiments, the crosslinking monomers are butylene glycol diacrylates.

Graftlinking monomers suitable for use in the core polymer generally are di- or poly-ethylenically unsaturated monomers copolymerizable with the other core monomers and having sufficiently low reactivity of one of the unsaturated groups to allow significant residual unsaturation to remain in the core polymer, such as, for example, allyl methacrylate ("ALMA"), allyl acrylate, diallyl maleate, allyl acryloxypropionate and the like. In some embodiments, the graftlinking monomer is ALMA.

Surrounding the core of a multi-stage polymer particle is one or more shells of polymer. The shell polymers may represent from 0.1 to 40 wt %, or from 5 to 40 wt %, or from 15 to 35 wt %, based on the total multi-stage polymer particle weight.

In some embodiments, the outer shell polymer of the multi-stage polymeric particles is thermodynamically compatible with the polymer at the surface of the second acrylic bead, described below. For example, a shell of poly(methyl methacrylate) will be thermodynamically compatible with a second polymer of poly(methyl methacrylate) or poly(vinyl chloride). Other such compatible polymer combinations for the first and second acrylic beads are known to those skilled in the art, and others may readily be determined by routine experimentation, as for example by preparing blends of proposed first and second acrylic beads and examining the blends for such evidence of compatibility as absence of haze, existence of a single glass transition temperature, and the like.

The first acrylic beads may be formed by methods known in the art such as, for example, emulsion polymerization, seeded growth processes, and suspension polymerization processes. Such polymers are described, for example, in U.S. Pat. Nos. 4,403,003; 7,768,602; 7,829,626, 9,410,053, and are also exemplified herein. The polymer may be may be made in a multiple-step process such as a core-shell process that may result in a multiphase particle or in a particle in which the phases co-mingle for a gradient of composition throughout the particle, or in a gradient process in which the composition is varied during one or more stages.

In some embodiments, the first acrylic beads are formed by emulsion polymerization. In some embodiments, the first acrylic beads are prepared by aqueous emulsion polymerization of at least one monomer component of either the core or single stage (co)polymer to form emulsion (co)polymer or oligomer seed particles, followed by swelling the seed particles with one or more monomer components of the core, e.g., via absorption, and polymerizing the one or more monomers within the emulsion seed particles to yield the particles of a desired average diameter and, preferably, having a narrow particle size distribution. The swelling and polymerizing steps may be repeated until the particles have grown to the desired core or single stage (co)polymer size. Where seed particles are pre-made, particles of varying size and composition suitable for use as first acrylic beads can be produced by using appropriately sized swellable (co)polymer or oligomer seeds. Seed particles may be made by conventional emulsion (co)polymerization. Suitable seed polymer precursors may include, but are not limited to, oligomeric emulsion polymer particles ranging from 30 to 500 nm. One or more, or all, swelling and polymerization steps may be performed in the absence of conditions limiting the molecular weight of the resulting (co)polymer, such as, for example, in the absence of a chain-transfer agent. However, initially-formed emulsion (co)polymer seed particles do not swell as readily as subsequent, larger particles having a lower overall molecular weight formed under conditions limiting the molecular weight of the resulting (co)polymer.

At least the final (co)polymerization stage is typically carried out under conditions which do not limit the polymer molecular weight.

More preferably, the core (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more, or all, of the swelling and polymerization steps can be performed using the conditions which restrict the polymer molecular weight and such steps can be alternated, followed by, or subsequent to swelling and polymerization steps may be performed in the absence of conditions limiting the molecular weight of the resulting (co)polymer. More preferably, the core or single stage (co)polymers may be made by emulsion polymerizing the monomers using conditions which restrict the molecular weight of the (co)polymer that forms, such as, for example, by including chain-transfer agents, e.g., mercaptans, in the polymerization mixture to form a more easily swellable emulsion oligomer or (co)polymer. Accordingly, one or more, or all, of the swelling and polymerization steps can be performed using the conditions which restrict the polymer molecular weight and such steps can be alternated, followed by, or subsequent to swelling and polymerization steps may be performed in the absence of conditions limiting the molecular weight of the resulting (co)polymer.

Crosslinking of any (co)polymer and any graftlinking of a core (co)polymer to a shell polymer results from inclusion of one or more copolymerizable crosslinking and/or graftlinking monomers in the polymerizable monomer mixtures. Alternatively, the core polymer may be crosslinked and the core polymer may be graftlinked to the shell polymer using other known techniques, for example, post-cure reactions, such as by forming a copolymer from a monomer having a pendant peroxide group and then activating the peroxide by heating to a temperature higher than that used in the polymerization. The activated peroxide group will promote graftlinking and crosslinking of the core-shell polymer components. In another example, crosslinking or graftlinking may be achieved post-cure by adding to the polymerization a second free-radical initiator that is stable at the initial polymerization temperature and is activated by light or at a higher temperature, followed by activating the initiator.

In some embodiments, the first acrylic beads are stabilized so as to minimize separation or sedimentation. This may be accomplished by the use of thickening or viscosity-building materials such as, for example, alkali-soluble emulsion polymers, hydrophobically modified alkali-soluble polymers, hydrophobically-enhanced urethane resins, and clay-based compositions incorporated in the aqueous matte coating compositions.

In some embodiments, the first acrylic beads have an acid number of from 5 to 100 mg KOH/g, calculated by determining the number of milliequivalents of acid per gram in the first polymer and multiplying by the molecular weight of potassium hydroxide. Acid monomers suitable for use in the first acrylic bead include, but are not limited to, carboxylic acid monomers such as, for example, acrylic acid, (meth)acrylic acid, crotonic acid, itaconic acid, fumaric acid, maleic acid, monomethyl itaconate, monomethyl fumarate, monobutyl fumarate, and maleic anhydride; and sulfur and phosphorous-containing acid monomers.

In some embodiments, the calculated $T_g$ of the first acrylic beads is from −60 to 150° C., or from −60 to 50° C. or from −60 to 0° C. The $T_g$ of the polymers herein are calculated herein by using the Fox equation (T. G. Fox, Bull. Am. Physics Soc., Volume 1, Issue No. 3, page 123(1956)). That is, for calculating the Tg of a copolymer of monomers $M_1$ and $M_2$, $$\frac{1}{Tg(calc)} = \frac{w(M_1)}{Tg(M_1)} + \frac{w(M_2)}{Tg(M_2)},$$

wherein

Tg (calc) is the glass transition temperature calculated for the copolymer;

$w(M_1)$ is the weight fraction of monomer $M_1$ in the copolymer;

$w(M_2)$ is the weight fraction of monomer $M_2$ in the copolymer;

$Tg(M_1)$ is the glass transition temperature of the homopolymer of $M_1$; and $Tg(M_2)$ is the glass transition temperature of the homopolymer of $M_2$, all temperatures being in units of K.

The $T_g$ of various monomers may be found, for example, in "Polymer Handbook", edited by J. Brandrup and E. H. Immergut, Interscience Publishers.

Polymerization techniques used to prepare the first acrylic beadsinclude known polymerization techniques and suitable techniques that come to be known. Examples of known techniques are disclosed in, for example, U.S. Pat. Nos. 4,325,856, 4,654,397, and 4,814,373. Suitable surfactants for use in the polymerization techniques include, but are not limited to, anionic and/or nonionic emulsifiers such as, for example, alkali metal or ammonium alkyl sulfates, alkyl sulfonic acids, fatty acids, and oxyethylated alkyl phenols. In some embodiments, the amount of surfactant used is from 0.1 to 6 wt %, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. The monomer mixture for a stage may be added neat or as an emulsion in water. The monomer mixture for a stage may be added in a single addition or more additions or continuously over the reaction period allotted for that stage using a uniform or varying composition. Additional components such as, for example, free radical initiators, oxidants, reducing agents, chain transfer agents, neutralizers, surfactants, and dispersants may be added prior to, during, or subsequent to any of the polymerization stages.

Multi-stage emulsion polymerization processes usually result in the formation of at least two mutually incompatible polymer compositions, thereby resulting in the formation of at least two phases. The mutual incompatibility of two polymer compositions and the resultant multiphase structure of the polymer particles may be determined in various ways known in the art. The use of scanning electron microscopy using staining techniques to emphasize the difference between the phases, for example, is such a technique. The multistage emulsion polymer herein is referred to as a core-shell polymer. The polymer particles include two or more phases of various geometries such as, for example, core-shell or core-sheath particles, core-shell particles with shell phases incompletely encapsulating the core, and core-shell particles with a multiplicity of cores.

The average particle diameter of the first acrylic beads is from 0.5 to 2 µm. Processes yielding polymodal particle size distributions such as those disclosed in U.S. Pat. Nos. 4,384,056 and 4,539,361, for example, may be employed. In some embodiments, the average particle size of the first acrylic beads is relatively smaller than the average particle size of the second acrylic beads discussed below.

Second Acrylic Beads (Larger Acrylic Beads)

Similarly as the first acrylic beads structure and process, in some embodiments, the aqueous matte coating composition further comprises second acrylic beads. In some embodiments, the average particle size of the second acrylic beads is relatively larger than the average particle size of the first acrylic beads discussed above. In some embodiments, the second acrylic beads account for from 20 to 85 wt %, based on the weight of the coating composition, and have a calculated $T_g$ of from −60 to 0° C. and an average particle diameter of from 0.5 to 30 µm.

In some embodiments, the polymeric particles of the second acrylic beads include, as copolymerized units, from 0.5 to 10%, or from 3 to 10%, multi-ethylenically unsaturated monomer, by weight based on the weight of the second acrylic beads. Suitable multi-ethylenically unsaturated monomers include, but are not limited to, allyl(meth)acrylate, diallyl phthalate, 1,4-butylene glycol di(meth)acrylate, 1,2-ethylene glycol di(meth)acrylate, 1,6-hexanediol di(meth)acrylate, divinyl benzene, and combinations thereof.

Polymerization techniques used to prepare the second acrylic beads include known polymerization techniques and suitable techniques that come to be known. Examples of suitable polymerization techniques include, for example, emulsion polymerization, seeded growth processes, and suspension polymerization processes. Such polymerization techniques are described, for example, in U.S. Pat. Nos. 4,403,003, 7,768,602, 7,829,626 and 9,410,053. The second acrylic beads may be may be made in a single-stage process, a multiple-step process such as a core-shell process that may result in a multiphase particle or in a particle in which the phases co-mingle for a gradient of composition throughout the particle, or in a gradient process in which the composition is varied during one or more stages.

Polymer Binders

In some embodiments, the aqueous matte coating composition includes a polymer as binder having a calculated $T_g$ of from 0 to 30° C. and an average particle diameter of from 0.03 to 0.5 µm, or from 0.1 to 0.5 µm. In some embodiments, the binder accounts for from 10 to 30 wt % of the aqueous matte coating composition, based on the weight of the aqueous matte coating composition.

The polymer binder typically includes at least one non-ionic copolymerized ethylenically unsaturated monomer such as, for example, a (meth)acrylic ester monomer including methyl(meth)acrylate, ethyl(meth)acrylate, butyl(meth)acrylate, 2-ethylhexyl(meth)acrylate, decyl(meth)acrylate, hydroxyethyl(meth)acrylate, hydroxypropyl(meth)acrylate, ureido-functional (meth)acrylates and acetoacetates, acetamides or cyanoacetates of (meth)acrylic acid; styrene or substituted styrenes; ethylene; vinyl toluene; butadiene; monoethylenically unsaturated acetophenone or benzophenone derivatives such as, for example, are taught in U.S. Pat. No. 5,162,415; vinyl acetate or other vinyl esters; vinyl monomers such as vinyl chloride, vinylidene chloride, vinylidene fluoride, and N-vinyl pyrollidone; (meth)acrylonitrile; N-alkylol(meth)acrylamide. The use of the term "(meth)" followed by another term such as (meth)acrylate or (meth)acrylamide, as used throughout the disclosure, refers to both acrylates or acrylamides and methacrylates and methacrylamides, respectively. The polymer binder may also be a urethane polymer. The polymer binder is substantially uncrosslinked; that is, the polymer binder includes less than 1 wt %, preferably less than 0.2 wt %, based on the weight of the polymer binder, and more preferably 0 wt %, of a copolymerized multi-ethylenically unsaturated monomer which allows it to form the continuous film after dying. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

In some embodiments, the polymer binder has an acid number of from 5 to 100 mg KOH/g, calculated by determining the number of milliequivalents of acid per gram in the first polymer and multiplying by the molecular weight of potassium hydroxide. Suitable acid monomers include, but are not limited to, carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur- and phosphorous-containing acid monomers. In some embodiments, the acid monomers are carboxylic acid monomers. In some embodiments, the acid monomers are (meth)acrylic acid.

The polymerization techniques used to prepare polymer binder include emulsion polymerization and other techniques well known in the art such as, for example, as disclosed in U.S. Pat. Nos. 4,325,856, 4,654,397, and 4,814,373. Conventional surfactants may be used such as, for example, anionic and/or nonionic emulsifiers such as, for example, alkali metal or ammonium alkyl sulfates, alkyl sulfonic acids, fatty acids, and oxyethylated alkyl phenols. In some embodiments, the amount of surfactant used is from 0.1 to 6 wt %, based on the weight of total monomer. In some embodiments, the polymerization can be either thermal or redox initiated. Conventional free radical initiators may be used such as, for example, hydrogen peroxide, t-butyl hydroperoxide, t-amyl hydroperoxide, ammonium and/or alkali persulfates, typically at a level of 0.01 to 3.0 wt %, based on weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. The monomer mixture for a stage may be added neat or as an emulsion in water. The monomer mixture for a stage may be added in a single addition or more additions or continuously over the reaction period allotted for that stage using a uniform or varying composition; preferred is the addition of the first and/or second polymer monomer emulsion as a single addition. Additional ingredients such as, for example, free radical initiators, oxidants, reducing agents, chain transfer agents, neutralizers, surfactants, and dispersants may be added prior to, during, or subsequent to any of the stages.

In some embodiments, the aqueous binder can be a polyurethane dispersion having a calculated $T_g$ of from 0 to 30° C. and an average particle diameter of from 0.03 to 0.5 µm, or from 0.5 to 0.5 µm, such as aliphatic or aromatic polyurethane dispersions or their combination, which can form the continuous film after matt coating drying.

Slip Additives

In some embodiments, the aqueous matte coating composition further comprises from 0.1 to 20 wt %, or from 0.1 to 10 wt %, based on the weight of the coating composition, of a slip additive. In some embodiments, the slip additive comprises a blend of a wax dispersion and a silicone emulsion. In some embodiments, the slip additive includes only a wax dispersion and a silicone emulsion. In some embodiments, the wax dispersion can be based on natural and synthetic waxes. Suitable wax dispersions can be based on waxes including, but are not limited to, carnauba waxes, amide waxes, paraffin waxes, polyolefin waxes, polytetrafluoroethylene ("PTFE") waxes, and combinations thereof. Waxes used in the slip additive are not limited to wax dispersions. In some embodiments, the wax can be solid powder which is then dispersed in water-based coatings. Commercially available examples of suitable wax dispersions/powders include, but are not limited to, waxes sold under the AQUACER™ trade name by BYK Additives & Instruments, waxes sold under the HYDROCER™ and S-400 N5™ trade names by Shamrock Technologies. Suitable silicone emulsions include, but are not limited to, polydimethylsiloxane ("PDMS")-based emulsions, polydiethylsiloxane ("PDES")-based emulsion, other emulsified silicone polymer and silicone copolymer products and combinations thereof, such as PDMS-based emulsions which are readily dispersible in water. Commercially available examples of suitable silicone emulsions include, but are not limited to, silicone emulsions sold by ICM Products Inc., such as TE 352 FG™, EM 350, ICM 3563FG, and by DowCorning, such as DC-24 emulsion.

In some embodiments, the slip additive comprises a polyurethane dispersion. In some embodiments, the slip additive includes only a polyurethane dispersion. Suitable polyurethane dispersions include, but are not limited to, aliphatic urethane polymer dispersions. Commercially available examples of suitable polyurethane dispersions include polyurethane dispersions sold under the KAMTHANE™ trade name by Kamsons Chemicals PVT. LTD.

In some embodiments, the slip additive comprises a wax dispersion, a silicone emulsion, and a polyurethane dispersion. In some embodiments, the slip additive comprises two or more selected from the group consisting of a wax dispersion, a silicone emulsion, and a polyurethane dispersion. In some embodiments, the slip additive comprises two or more silicone emulsions. In some embodiments, the slip additive comprises two or more wax dispersions. In some embodiments, the slip additive comprises two or more polyurethane dispersions.

Aqueous Matte Coating

The aqueous matte coating composition can be prepared by techniques that are known in the coatings art. In some embodiments, the first acrylic beads, the second acrylic beads, the polymer binder, and the slip additives are added under low shear stirring along with other coatings adjuvants as desired. In some embodiments, the slip additive is post-blended with the acrylic beads and polymer binder and other additives such as defoamer, rheology modifier, wetting agents etc. The aqueous matte coating composition may contain, in addition to the acrylic beads and slip additives, film-forming or non-film-forming solution or emulsion polymers, not within the parameters of the acrylic beads, in an amount of 0 to 30 wt % of the sum of the first and second acrylic beads, and conventional coatings adjuvants such as, for example, emulsifiers, coalescing agents, antifreezes, curing agents, buffers, neutralizers, thickeners, rheology modifiers, humectants, wetting agents, plasticizers, antifoaming agents, UV absorbers, fluorescent brighteners, light or heat stabilizers, biocides, chelating agents, dispersants, colorants, water-repellants, organic or inorganic pigments, extenders, and anti-oxidants.

Without being bound by a specific theory, it is believed that the coating is formed from the aqueous polymeric coating in such a manner that predominantly the polymer binder particles fuse to form a continuous film while the first and second acrylic beads retain their particulate nature. Consequently, the film formation of the polymer binder may benefit from coalescing agents, heat, and the like, but desirably not to a level or extent that would jeopardize the retention of the particulate identity and dimension In the aqueous coating composition of the present disclosure, the dry weight ratio of the sum of the first acrylic beads and the second acrylic beads to the polymer binder is from 60:40 to 90:10, or from 70:30 to 80:20; the weight ratio of the second acrylic beads to the first acrylic beads is from 80:20 to 60:40, or from 70:30 to 60:40; the aqueous coating composition includes 0.1 to 20 wt %, or from 1 to 10 wt % of slip additives, and the aqueous coating composition includes less than 10%, or less than 5%, or less than 2%, or 0%, by volume, inorganic extender particles. Inorganic extender particles include calcium carbonate, calcium sulfate, barium sulfate, mica, clay, calcined clay, feldspar, nepheline, syenite, wollastonite, diatomaceous earth, alumina silicates, non-film forming polymer particles, aluminum oxide, silica, and talc, or other metallic oxides or salts.

The aqueous matte coating composition is prepared by techniques which are well known in the coatings art. The components are added under stirring along with other coatings adjuvants as desired.

The solids content of the aqueous matte coating compositions may be from 10 to 70 wt %, or from 20 to 50 wt %, or from 30 to 40 wt % by weight measured with Mettler Toledo moisture analyzer. The viscosity of the aqueous matte coating compositions may be from 20 to 50 seconds, or from 25 to 35 seconds, at 25° C. as measured using a Gardner Zahn viscosity cup #2; viscosities appropriate for different application methods may vary considerably.

In the methods for providing a coating of the present disclosure, the aqueous coating composition is incorporated with 0.5 to 5 parts crosslinker, such as water dispersible aliphatic polyisocyanate, before being applied to a substrate and, dried, or allowed to dry. The aqueous coating composition is typically applied to a substrate such as, for example, polyester ("PET") films, polyolefin films including pigmented non-pigmented polyethylene and polypropylene and their hybrids, oriented polypropylene ("OPP") and biaxially-oriented polypropylene ("BOPP") films, nylon films, paper and paper cardboard, leather, metalized and foil, polyvinyl chloride, woven or nonwoven textiles, ceramic coated polymeric films, printed and non-printed films. The aqueous coating composition may be applied to a substrate using gravure or flexographic printing technology, or conventional coatings application methods such as, for example, hand drawdown with a handproofer or a meyer rod, paint brush, paint roller, curtain coater and spraying methods such as, for example, air-atomized spray, air-assisted spray, airless spray, high volume low pressure spray, and air-assisted airless spray.

Drying of the aqueous coating composition may be allowed to proceed under ambient conditions such as, for example, at 5 to 35° C. or the coating may be dried at elevated temperatures such as, for example, from 35 to 150° C.

Examples of the Disclosure

The present disclosure will now be explained in further detail by showing Illustrative Examples and Comparative Examples (collectively, "the Examples"). However, the scope of the present disclosure is not, of course, limited to the embodiments in the Examples.

Matte Coating Raw Materials

The relevant raw materials used in preparation of the Examples are identified in Table 1.

TABLE 1

Relevant Raw Materials of the Examples

| Raw Materials | Description | Supplier |
|---|---|---|
| OPULUX ™ 3000 | Acrylic beads | The Dow Chemical Company |
| OPULUX ™ 3500 | Acrylic beads | The Dow Chemical Company |
| OPULUX ™ 5001 | Matte coating without slip additive(s) | The Dow Chemical Company |
| OPULUX ™ 1000 | Acrylic binder | The Dow Chemical Company |
| TEGO ™ Foamex 1488 | Defoamer emulsion | Evonik |
| TRITON ™ GR-5M | Wetting agent, anionic, sulfosuccinate surfactant | The Dow Chemical Company |
| Aqua Ammonia BE 26 | Ammonia in water | The Dow Chemical Company |
| ACRYSOL ™ RM-8W | Nonionic urethane rheology modifier | The Dow Chemical Company |
| DI Water | Deionized water | The Dow Chemical Company |
| TE 352 FG | 35% active emulsion of 350 cs polydimethylsiloxane | ICM Products Inc. |
| AQUACER ™ 8640 | Carnauba wax dispersion | BYK Additives & Instruments |
| AQUACER ™ 2650 | Carnauba wax dispersion | BYK Additives & Instruments |
| HYDROCER ™ 145 | Amide wax dispersion | Shamrock Technologies, Inc. |
| S-400 N5 | Amide wax powder | Shamrock Technologies, Inc. |
| KAMTHANE ™ S-1801 | Polyurethane dispersion | Kamsons Chemical PVT. LTD. |
| KAMTHANE ™ 1432 | Polyurethane dispersion | Kamsons Chemical PVT. LTD. |

Matte Coating Formulations

Example formulations are summarized in Tables 2 through 4. For the Examples listed in Table 2, the slip additives, comprising a silicone emulsion and wax dispersion/powder, are post-blended into the acrylic beads, i.e., OPULUX™ 5001, by mixing for 2 minutes with a high-speed mixer.

TABLE 2

Illustrative Examples ("IE") 1 to 4 and Comparative Examples ("CE") 1 to 3

| | IE1 (g) | IE2 (g) | IE3 (g) | IE4 (g) | CE1 (g) | CE2 (g) | CE3 (g) |
|---|---|---|---|---|---|---|---|
| OPULUX ™ 5001 | 100 | 100 | 100 | 100 | 100 | 100 | 100 |
| TE-352 FG (40.6%) | 1.18 | 1.18 | 1.18 | 1.18 | | 1.18 | |
| AQUACER ™ 8640 | 1.83 | 2.74 | | | | | |
| S-400 N5 (powder) | | | 0.32 | 0.64 | | | 0.64 |
| Solid content (%) | 32 | 32 | 32 | 32.5 | 32 | 32 | 32 |
| Viscosity (Zahn cup, #2) | 27 | 27 | 29 | 30 | 28 | 28 | 30 |

For the Examples listed in Table 3, the following steps are taken to formulate the samples: the acrylic binder, i.e., OPULUX™ 3500, and acrylic bead, i.e., OPULUX™ 3000, are loaded into a container. Next, the defoamer, i.e., TEGO™ Foamex 1488, is added to the container under agitation. Acrylic binder, i.e., OPULUX™ 1000 is then added, and the pH is adjusted by addition of ammonia. The rheology modifier, i.e., ACRYSOL™ RM-8W, is then added slowly under agitation and mixing is continued for 15 to 20 minutes. Finally, the wetting agent, i.e., TRITON™ GR-5M, and slip additives are added and mixing is continued for 20 minutes.

TABLE 3

IE5 to IE7 and CE4

|  | IE5 (g) | IE6 (g) | IE7 (g) | CE4 (g) |
|---|---|---|---|---|
| OPULUX ™ 1000 | 18.50 | 18.65 | 18.48 | 19.23 |
| OPULUX ™ 3000 | 25.12 | 25.32 | 25.10 | 26.11 |
| OPULUX ™ 3500 | 50.92 | 51.32 | 50.87 | 52.91 |
| TEGO ™ Foamex 1488 | 0.05 | 0.05 | 0.05 | 0.05 |
| TRITON ™ GR-5M | 0.05 | 0.05 | 0.05 | 0.05 |
| Ammonia | 0.12 | 0.12 | 0.12 | 0.13 |
| ACRYSOL ™ RM-8W | 1.14 | 1.15 | 1.14 | 1.19 |
| DI water with ammonia | 0.10 | 0.10 | 0.00 | 0.10 |
| DI water with ACRYSOL ™ RM-8W | 0.23 | 0.23 | 0.00 | 0.24 |
| Total DI water | 0.33 | 0.33 | 0.00 | 0.34 |
| TE-352 FG (40.6%) | 1.14 | 1.15 | 1.13 |  |
| AQUACER ™ 8640 | 2.64 |  |  |  |
| HYDROCER ™ 145 |  | 1.86 |  |  |
| Aquacer 2650 (30%) |  |  |  | 3.07 |
| Total | 100.00 | 100.00 | 100.00 | 100.00 |
| Solid content (%) | 32 | 32 | 32 | 32 |
| Viscosity (Zahn cup #2) | 29 s | 29 s | 41 s | 32 s |

The Examples listed in Table 4 are formulated the same as those listed in Table 3, except that the polyurethane dispersion, i.e., KAMTHANE™ is used as binder, replacing the OPULUX™ 1000.

TABLE 4

IE8, IE 9, and CE5

|  | IE8 (g) | IE9 (g) | CE5 (g) |
|---|---|---|---|
| KAMTHANE ™ S-1801 | 19.23 |  |  |
| KAMTHANE ™ 1432 |  | 19.23 |  |
| OPULUX ™ 1000 |  |  | 19.23 |
| OPULUX ™ 3000 | 26.11 | 26.11 | 26.11 |
| OPULUX ™ 3500 | 52.91 | 52.91 | 52.91 |
| TEGO FOAMEX ™ 1488 | 0.05 | 0.05 | 0.05 |
| TRITON ™ GR-5M | 0.05 | 0.05 | 0.05 |
| Ammonia | 0.13 | 0.13 | 0.13 |
| ACRYSOL ™ RM-8W | 1.19 | 1.19 | 1.19 |
| DI water with ammonia | 0.10 | 0.10 | 0.10 |
| DI water with ACRYSOL ™ RM-8W | 0.24 | 0.24 | 0.24 |
| Total DI water | 0.34 | 0.34 | 0.34 |
| Total | 100.00 | 100.00 | 100.00 |
| Solid content (%) | 32 | 33 | 32 |
| Viscosity (Zahn cup #2) | 45 s | 39 s | 32 s |

Matte Coating Application

Before applying the matte coating composition, 2 parts of water-dispersible polyisocyanate (e.g., CR 9-101 commercially available by The Dow Chemical Company) per hundred parts formulated matte coating is added into the formulated sample under overhead agitation and mixed for 20 minutes before application.

The formulated samples from Table 2 are applied on to 92 gauge non-treated polyester ("PET") film with a 200Q hand proofer by targeting 1.0 lb/rm coating weight. The coated PET film is dried in an oven set to 80° C. for 1 minute. The gloss of the matte finishes is tested after drying. Other performance tests are conducted after 1 week curing at room temperature (approximately 25° C.). The dried matte coating performances are detailed in Table 5.

The formulated samples from Table 3 are coated to 92 gauge PET film and to 80 gauge oriented polypropylene ("OPP") film on a LABOCOMBI™ pilot coater at 300 ft/min with a 130Q/12.5BCM volume gravure cylinder and applying a smoothing bar. The target coating weight is 1.0 to 1.2 lb/rm. The coated samples are dried in a three-zone oven. The drying temperatures of the three-zone oven are 170° F./180° F./190° F. for the PET film and 170° F./170° F./170° F. for the OPP film. Both films are in-situ treated with corona treatment before coating. The coated samples are stored at 25° C. and 50% relative humidity for one week before the performance tests. The performance results are detailed in Table 6.

The formulated samples from Table 4 are coated on 92 gauge non-treated PET film with a 200Q hand proofer by targeting 1.0 lb/ream coating weight. The coated PET film is dried in an oven set to 80° C. for 1 minute. The gloss of the matte finishes is tested after drying. Other performance tests are conducted after 1 week curing at room temperature (approximately 25° C.). The dried matte coating performances are detailed in Table 7.

Test Methods

Viscosity of the formulated samples (before incorporation of crosslinker) are measured using #2 Zahn cup method.

Gloss of the coated polyester films is analyzed using BYK Gardner Glossmeter (micro-tri-gloss) at 60 and 85 degrees on a black paper board as background.

Sutherland rub resistance is determined using Sutherland Ink Rub Tester with 2 lb or 4 lb weight pad at running speed 1. All coated films are allowed to cure at room temperature (approximately 25° C.) for 1 week before conducting the test. The data is recorded based on 50 times/read.

Coefficient of Friction ("COF") is determined using the TMI Friction and Slip Tester Model 32-06-00 at 25° C. and 50% relative humidity.

Heat seal resistance of the coated films is evaluated by V-Fold heat resistance test with a heat sealer at 400° F., 40 psi, and 2 seconds duration time. After heat seal, pass=no adhesion or no finish removed or no gloss change; fail=films stacked together or matte finish peeled off or gloss change.

Table 5 shows the performance of the Examples from Table 2. The performance results indicate that the combination of the silicone emulsion and waxes (dispersion and powder) improve the Sutherland rub resistance significantly and reduce the coefficient of friction of matte coatings.

TABLE 5

Performance Results for IE1 to IE4 and CE1 to CE3

|  | IE1 | IE2 | IE3 | IE4 | CE1 | CE2 | CE3 |
|---|---|---|---|---|---|---|---|
| Coating weight (lb/rm) | 0.9 | 0.86 | 0.9 | 0.87 | 0.90 | 0.9 | 0.91 |
| Static COF, AVE | 1.246 | 1.179 | 1.619 | 1.690 | 2.401 | 1.917 | 2.012 |
| Static COF, STD | 0.039 | 0.119 | 0.165 | 0.119 | 0.159 | 0.131 | 0.213 |
| Kinetic COF, AVE | 0.830 | 0.759 | 0.755 | 0.839 | 2.096 | 1.551 | 1.675 |
| Kinetic COF, STD | 0.066 | 0.132 | 0.147 | 0.071 | 0.100 | 0.109 | 0.321 |
| Sutherland Rub (times, 2# weight) | 300-350 | 350-400 | 400-450 | 350-400 | 50-100 | 150-200 | 100-150 |
| Thermal resistance (400° F., 40 psi, 2 sec) | Pass | Pass | Pass | Pass | Pass | Pass | Pass |

Table 6 shows the performance results of the Examples from Table 3. The performance results further indicate performance improvement by incorporation of a combination of silicone emulsion and wax dispersions.

TABLE 6

Performance Results for IE5 to IE7 and CE4

| | Performance | | | | | | | |
|---|---|---|---|---|---|---|---|---|
| | IE5 | | IE6 | | IE7 | | CE4 | |
| Substrate | PET | OPP | PET | OPP | PET | OPP | PET | OPP |
| Coating weight | 1.0 | 1.0 | 0.9 | 0.9 | 0.9 | 0.9 | 1.1 | 1.1 |
| Static COF, AVE | 1.282 | 1.458 | 1.480 | 1.934 | 2.065 | 1.945 | 2.170 | 2.910 |
| Static COF, STD | 0.165 | 0.178 | 0.155 | 0.019 | 0.219 | 0.049 | 0.121 | 0.171 |
| Kinetic COF, AVE | 0.884 | 1.063 | 0.763 | 1.210 | 1.289 | 1.120 | 1.640 | 2.500 |
| Kinetic COF, STD | 0.129 | 0.055 | 0.087 | 0.011 | 0.080 | 0.265 | 0.050 | 0.034 |
| Gloss, 60° | 9.8 | 10.6 | 9.3 | 8.9 | 9.4 | 9.5 | 9.7 | 9.6 |
| Gloss, 60° STD | 0.4 | 0.2 | 0.3 | 0.2 | 0.2 | 0.2 | 0.2 | 0.1 |
| Gloss, 85° | 5.1 | 4.9 | 3.25 | 3.0 | 3.1 | 3.5 | 11.7 | 8.3 |
| Gloss, 85° STD | 0.6 | 0.5 | 0.4 | 0.5 | 0.3 | 0.4 | 0.3 | 0.2 |
| Sutherland Rub (times, 4# weight) | >1000* | >1000 | >1000 | >1000 | >1000 | >1000 | 100-150 | 50-100 |
| Thermal resistance (400° F., 40 psi, 2 sec) | Pass | Pass | Pass | Pass | Pass | Pass | Pass | Pass |

*not tested above 1000 rub times

Table 7 shows the performance of the Examples from Table 4. The performance results indicate improved abrasion resistance and COF reduction with polyurethane dispersion as the binder.

TABLE 7

Performance Results for IE8, IE 9, and CE5

|  | IE8 | IE9 | CE5 |
|---|---|---|---|
| Coating weight (lb/rm) | 0.85 | 0.86 | 0.86 |
| Static COF, AVE | 1.588 | 1.643 | 2.387 |
| Static COF, STD | 0.044 | 0.065 | 0.465 |
| Kinetic COF, AVE | 1.236 | 1.258 | 1.644 |
| Kinetic COF, STD | 0.118 | 0.043 | 0.595 |
| Sutherland Rub (times, 2# weight) | 200-220 | 200-220 | 100-120 |
| Thermal resistance (400° F., 40 psi, 2 sec) | Pass | Pass | Pass |

The invention claimed is:

1. An aqueous matte coating composition, comprising:
   (a) from 10 to 65% by weight, based on the weight of the aqueous matte coating composition, of a first acrylic bead having a calculated Tg of from −30° C. to 10° C. and an average particle diameter of from 0.5 to 2 µm;
   (b) from 20 to 80% by weight, based on the weight of the aqueous matte coating composition, of a second acrylic bead having a calculated Tg of from −60 to 0° C. and an average particle diameter of from 3 to 30 µm;
   (c) from 10 to 30% by weight, based on the weight of the aqueous matte coating composition, of a polymer binder having an average particle diameter of from 0.03 to 0.5 µm; and
   (d) from 0.1 to 20% by weight, based on the weight of the aqueous matte coating composition, of a slip additive comprising a silicone emulsion and a wax dispersion, wherein the silicone emulsion is a polydimethylsiloxane-based emulsion and wherein the wax dispersion is selected from the group consisting of a carnauba wax dispersion, an amide wax dispersion, and combinations of two or more thereof.

2. The aqueous matte coating composition of claim 1, further comprising a polyurethane dispersion.

3. The aqueous matte coating composition of claim 1, wherein the slip additive comprises from 0.1 to 10% by weight of the aqueous matte coating composition, based on the weight of the coating composition.

4. A method for applying an aqueous matte coating composition to a substrate, comprising:
(a) forming the aqueous matte coating composition, comprising:
  (i) from 10 to 65% by weight, based on the weight of the aqueous matte coating composition, of a first acrylic bead having a calculated Tg of from −30 to 10° C. and an average particle diameter of from 0.5 to 2 μm;
  (ii) from 20 to 85% by weight, based on the weight of the aqueous matte coating composition, of a second acrylic bead having a calculated Tg of from −60 to 0° C. and an average particle diameter of from 3 to 30 μm;
  (iii) from 10 to 30% by weight, based on the weight of the aqueous matte coating composition, of a polymer binder having an average particle diameter of from 0.03 to 0.5 μm; and
  (iv) from 0.1 to 20% by weight, based on the weight the aqueous matte coating composition, of a slip additive comprising a silicone emulsion and a wax dispersion, wherein the silicone emulsion is a polydimethylsiloxane-based emulsion and wherein the wax dispersion is selected from the group consisting of a carnauba wax dispersion, an amide wax dispersion, and combinations of two or more thereof;
(b) applying the aqueous matte coating composition to a substrate; and
(c) drying, or allowing to dry, the applied aqueous matte coating composition.

* * * * *